US012621122B2

(12) United States Patent
Riedinger

(10) Patent No.: US 12,621,122 B2
(45) Date of Patent: May 5, 2026

(54) METHOD AND APPARATUS FOR TRANSMITTING DATA ASSOCIATED WITH A DATA SOURCE

(71) Applicant: Robert Bosch GmbH, Stuttgart (DE)

(72) Inventor: Andreas Riedinger, Freiburg (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 18/319,739

(22) Filed: May 18, 2023

(65) Prior Publication Data
US 2023/0379139 A1     Nov. 23, 2023

(30) Foreign Application Priority Data
May 19, 2022     (DE) ..................... 10 2022 205 002.9

(51) Int. Cl.
*H04L 9/06*     (2006.01)
(52) U.S. Cl.
CPC ................................. *H04L 9/0618* (2013.01)
(58) Field of Classification Search
CPC ... H04L 9/0618; H04L 9/3239; H04L 9/3242; H04L 9/3247
See application file for complete search history.

(56) References Cited

U.S. PATENT DOCUMENTS

| | | | | |
|---|---|---|---|---|
| 2005/0235154 A1* | 10/2005 | Serret-Avila | ............ | G06F 21/53 |
| | | | | 713/176 |
| 2006/0288204 A1* | 12/2006 | Sood | ..................... | H04L 63/083 |
| | | | | 713/181 |
| 2008/0170693 A1* | 7/2008 | Spies | .................... | H04L 9/0891 |
| | | | | 380/277 |
| 2012/0204034 A1* | 8/2012 | Martinez | ............... | H04L 1/1607 |
| | | | | 713/176 |
| 2013/0332743 A1* | 12/2013 | Gueron | ................. | H04L 9/0643 |
| | | | | 713/189 |
| 2016/0099926 A1* | 4/2016 | Lee | ......................... | H04L 63/08 |
| | | | | 726/7 |
| 2023/0379139 A1* | 11/2023 | Riedinger | ............ | H04L 9/3242 |

OTHER PUBLICATIONS

Dworkin et al., "Recommendation for Block Cipher Modes of Operation: The CMAC Mode of Authentication," NIST Special Publication 800-38B, National Institute of Standards and Technology, May 2005, https://doi.org/10.6028/NIST.SP.800-38B (21 pages).

* cited by examiner

*Primary Examiner* — Ponnoreay Pich
(74) *Attorney, Agent, or Firm* — Maginot, Moore & Beck LLP

(57)     ABSTRACT
A method of transmitting data associated with a data source, for example a sensor device, for example for a motor vehicle, includes determining first information that enables a verification of authenticity and/or integrity of at least one data value available from the data source, and transmitting a plurality of data values to at least one further unit. At least some data values of the plurality of data values are transmitted together with one, e.g., respective, portion of the first information.

12 Claims, 5 Drawing Sheets

250

DW-1,DW-2,DW-3, ...

252

I-1

254

300

302    304a    304    304b    306

DAT    PRG    DCS

SM

PRG

METHOD AND APPARATUS FOR TRANSMITTING DATA ASSOCIATED WITH A DATA SOURCE

This application claims priority under 35 U.S.C. § 119 to patent application no. DE 10 2022 205 002.9, filed on May 19, 2022 in Germany, the disclosure of which is incorporated herein by reference in its entirety.

BACKGROUND

The disclosure relates to a method, for example a computer-implemented method, for transmitting data associated with a data source.

The disclosure furthermore relates to an apparatus for transmitting data associated with a data source.

The disclosure furthermore relates to a method, for example a computer-implemented method, for receiving data associated with a data source.

The disclosure furthermore relates to an apparatus for receiving data associated with a data source.

SUMMARY

Exemplary embodiments relate to a method, for example a computer-implemented method, for transmitting data associated with a data source, for example a sensor device, for example for a motor vehicle, comprising: determining first information that enables a verification of authenticity and/or integrity of at least one data value available from the data source, transmitting a plurality of data values to at least one further unit, wherein at least some data values of the plurality of data values are transmitted together with a, e.g., respective, portion of the first information. In this way, in further exemplary embodiments, the first information can quasi be distributed over a plurality of data values and transmitted together with the plurality of data values to the at least one further unit, wherein, for example, a bandwidth used for transmitting the first information is comparatively small and results in a correspondingly low or no interference in transmitting the data values.

In further exemplary embodiments, the at least one further unit can receive the transmitted data values with the portions of the first information; for example, it can aggregate the first information from the received portions of the first information, and use the thereby aggregated first information, for example, to verify the authenticity and/or integrity of at least one data value that can be provided by and/or is transmitted to the further unit by the data source.

In further exemplary embodiments, the method according to the embodiments can be carried out, for example, by means of a sensor device comprising the data source, and the at least one further unit is, for example, a controller formed to receive and/or process the data values. For example, the sensor device is a sensor device for a steering system of a vehicle.

In further exemplary embodiments, for example, successive data values to be transmitted can be provided with a corresponding portion of the first information or transmitted with this corresponding portion of the first information.

In further exemplary embodiments, for example, data values that are not directly successive and are to be transmitted can be provided with a corresponding portion of the first information or transmitted with this corresponding portion of the first information. In other words, for example, some of the data values to be transmitted can be transmitted together with corresponding portions of the first information, while some of the other data values to be transmitted, for example, cannot be transmitted together with corresponding portions of the first information.

In further exemplary embodiments, it is provided that the determination of the first information comprises forming at least one message authentication code, for example, a message authentication code, MAC, based on at least one data value; wherein, for example, the message authentication code is of the CMAC type, and has, for example, has a length of 128 bits or more.

In further exemplary embodiments, it is provided that the method comprises: forming the first information based on the at least one data value and on second information, wherein, for example, the second information comprises at least one of the following elements: a) a random value, b) a pseudo-random value, c) a counter value of a counter, wherein, for example, the counter can be repeatedly initialized, for example, based on a random value or pseudo-random value, for example, upon the activation of an apparatus performing the method.

In further exemplary embodiments, it is provided that transmitting the plurality of data values to the at least one further unit comprises: combining, for example concatenating, a first data value of the plurality of data values with a first portion of the first information into a first data packet, transmitting the first data packet to the at least one further unit, and optionally repeating the combining and transmitting for at least one further data value.

In further exemplary embodiments, it is provided that an amount of data used to represent the portion of the first information is less than or equal to 20 percent of an amount of data used to represent the at least one data value, e.g., less than or equal to 5 percent, e.g., less than or equal to 1 percent.

In further exemplary embodiments, it is provided that the method comprises: determining the first information for each $n$th data value of the data source, with $n>8$, wherein, for example, $n$ is a power of two, distributing the first information to $m$ many data values, with $m>=2$, wherein $m=n$, for example, transmitting the $m$ many data values, respectively, with a respective portion of the distributed first information.

For example, the data source can repeatedly, e.g., periodically, provide data values in further exemplary embodiments; for example at a rate of 2 kHz, i.e., 2000 data values per second. For example, the first information I-1 can be formed for each 128th data value, e.g., in the form of a 128-bit CMAC. For example, the 128-bit CMAC can be divided into 128 portions, each consisting of 1 bit, which are respectively transmitted, e.g., together with a data value, to the at least one further unit. After receiving 128 data values with the respective portions of the first information, the further unit thus has all 128 portions of the first information, meaning that a local verification, e.g., of the data value underlying the 128-bit CMAC, can be performed by the further unit.

In further exemplary embodiments, the portions of the first information can also have different sizes than the one bit mentioned above; for example, two or more bits.

In further exemplary embodiments, it is provided that the method comprises at least one of the following elements: providing a first key; for example, for determining the first information, (e.g., a symmetric key for CMAC formation); providing second information or, respectively, more than one item of second information, for example, for determining the first information; determining the first data value, determining the first information based on the first key, the second information and the first data value; partitioning the first information into n many portions; transmitting n many data values, respectively together, with a, e.g., portion of the first information to the at least one further unit, and optionally, repeating at least some aspects; e.g., for at least one further data value.

Further exemplary embodiments relate to a method, for example a computer-implemented method, for receiving data associated with a data source, e.g., a sensor device, e.g., for a motor vehicle, comprising: receiving a plurality of data values, wherein at least some data values of the plurality of data values are each associated with a portion of first information, wherein the first information allows for a verification of authenticity and/or integrity of at least a first data value that can be provided and/or received using a data source, aggregating the portions of the first information into the first information, verifying the authenticity and/or integrity of the at least one first data value based on the first information. For example, the method can be performed in the at least one further unit (e.g., a controller); e.g., to receive data values that were transmitted according to the principle according to the embodiments with respectively associated portions of the first information.

Further exemplary embodiments relate to an apparatus for performing the method according to the embodiments.

In further exemplary embodiments, the apparatus can be formed to perform at least some aspects of the method according to the embodiments.

Further exemplary embodiments relate to a sensor device, for example for a motor vehicle, comprising at least one apparatus according to the embodiments.

Further exemplary embodiments relate to a controller, for example for a motor vehicle, comprising at least one apparatus according to the embodiments.

Further exemplary embodiments relate to a technical product, for example a motor vehicle, having at least one apparatus according to the embodiments and/or at least one sensor device according to the embodiments and/or at least one controller according to the embodiments.

Further exemplary embodiments relate to a computer-readable storage medium comprising instructions that, when executed by a computer, cause the computer to perform the method according to the embodiments.

Further exemplary embodiments relate to a computer program comprising instructions that, when the program is executed by a computer, cause the computer to perform the method according to the embodiments.

Further exemplary embodiments relate to a data carrier signal that transmits and/or characterizes the computer program according to the embodiments.

Further exemplary embodiments relate to a use of the method according to the embodiments and/or the apparatus according to the embodiments and/or the sensor device according to the embodiments and/or the controller according to the embodiments and/or the technical product according to the embodiments and/or the computer-readable storage medium according to the embodiments and/or the computer program according to the embodiments and/or the data carrier signal according to the embodiments for at least one of the following elements: a) securing, for example securing cryptographically, an integrity and/or authenticity of data associated with the data source, b) detecting attacks on a data link between the data source and the at least one further unit, c) distributing the first information among a plurality of data packets, d) preventing unauthorized introduction of data into a data link between the data source and the at least one further unit.

Further features, possible applications and advantages of the invention emerge from the following description of embodiment examples of the invention, which are shown in the figures of the drawing. All of the described or illustrated features constitute the subject matter of the invention, either alone or in any combination, regardless of their consolidation in the claims or their back reference and regardless of their wording or representation in the description or in the drawing.

DETAILED DESCRIPTION

Figure 1:
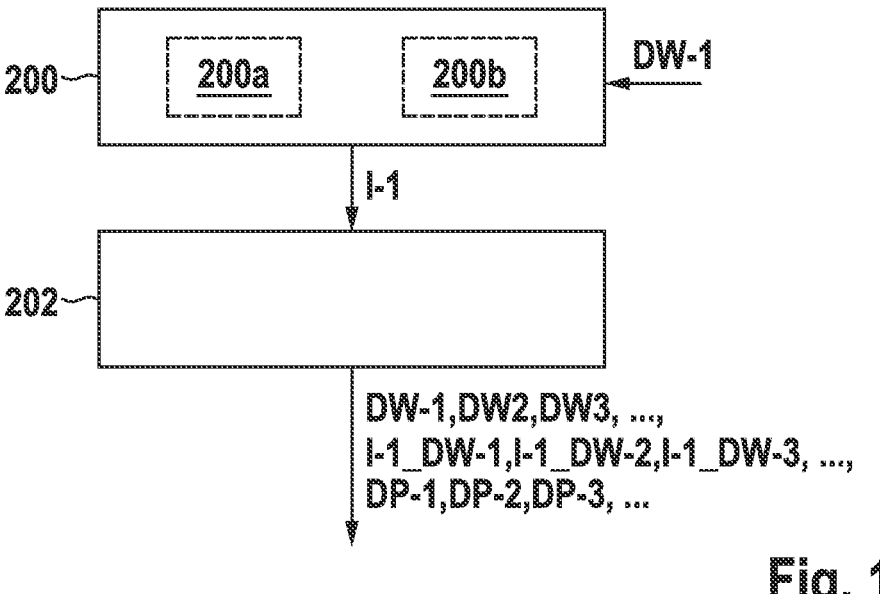
FIG. 1 schematically shows a simplified flow chart according to exemplary embodiments, FIG. 2 schematically shows a simplified flow chart according to further exemplary embodiments, FIG. 3 schematically shows a simplified block diagram according to further exemplary embodiments, FIG. 4 schematically shows a simplified flow chart according to further exemplary embodiments, FIG. 5 schematically shows a simplified flow chart according to further exemplary embodiments, FIG. 6 schematically shows a simplified block diagram according to further exemplary embodiments, FIG. 7 schematically shows a simplified flow chart according to further exemplary embodiments, FIG. 8 schematically shows a simplified block diagram according to further exemplary embodiments, FIG. 9 schematically shows a simplified block diagram according to further exemplary embodiments, FIG. 10 schematically shows a simplified block diagram according to further exemplary embodiments, and FIG. 11 schematically shows aspects of applications according to further exemplary embodiments.
Figure 6:
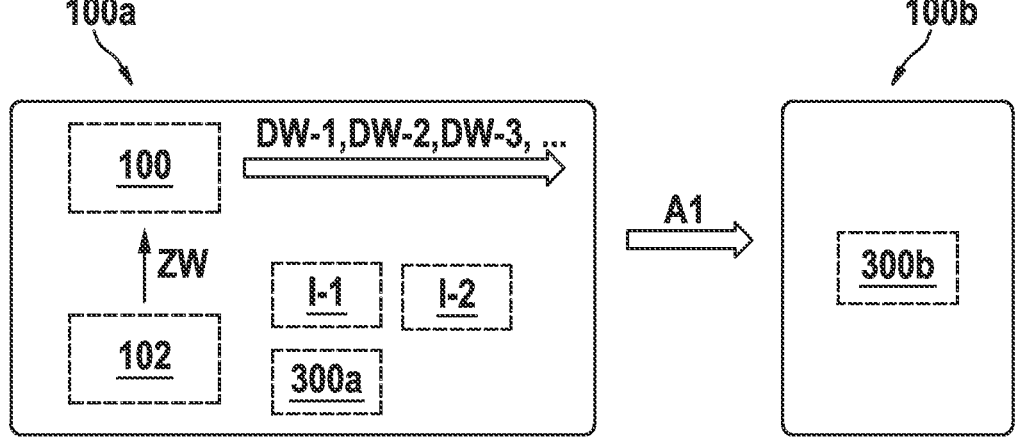

The exemplary embodiments, FIG. 1, refer to a method, e.g., a computer-implemented method, for transmitting data associated with a data source 100, cf. FIG. 6, e.g., a sensor device 100*a*, e.g., for a motor vehicle 10 (FIG. 9), comprising: determining 200 (FIG. 1) first information I-1, thereby enabling the verification of an authenticity and/or integrity of at least one data value DW-1 that can be provided by the data source 100; transmitting 202 a plurality of data values DW-1, DW-2, DW-3, . . . to at least one further unit 100*b* (FIG. 6), wherein at least some data values of the plurality of data values DW-1, DW-2, DW-3, . . . are transmitted together with one, e.g., respective, portion I-1_DW-1, I-1_DW-2, I-1_DW-3, . . . of the first information I-1. In this way, in further exemplary embodiments, the first information I-1 can quasi be distributed among a plurality of data values and transmitted together with the plurality of data values to the at least one further unit 100*b*, whereby, for example, a bandwidth used for transmitting 202 the first information I-1 is comparatively small and results in a correspondingly low or no interference in transmitting 202 the data values.

In further exemplary embodiments, the at least one further unit 100*b* (FIG. 6) can receive the transmitted data values DW-1, DW-2, . . . with portions I-1_DW-1, I-1_DW-2, . . . of the first information I-1; for example, it can aggregate the first information I-1 from the received portions of the first information I-1, and use the thereby aggregated first information I-1, e.g., to verify an authenticity and/or integrity of at least one data value DW-1 that can be provided or transmitted to the further unit 100*b* by the data source 100, . . . .

Figure 9:
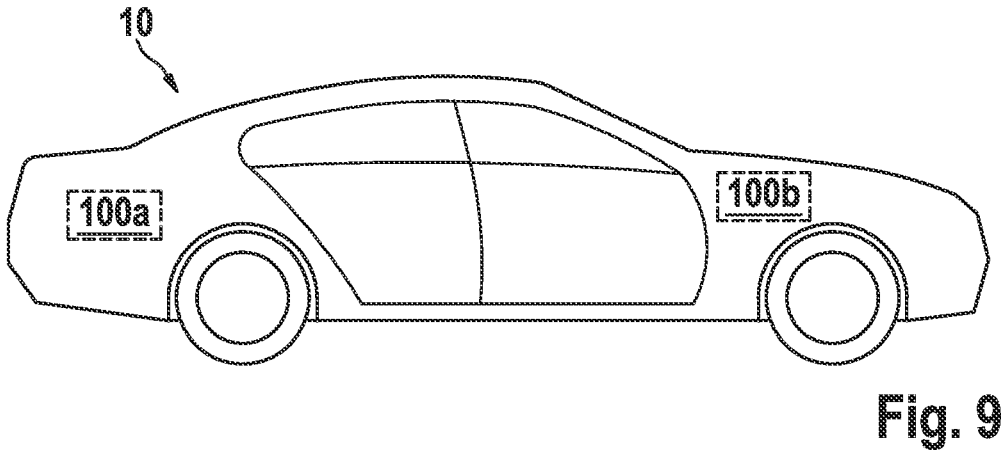

In further exemplary embodiments, FIG. 6, the method according to the embodiments can be performed, for example, by means of a sensor device 100*a* comprising the data source 100, and the at least one further unit 100*b* is comprised e.g., by a controller formed to receive and/or process the data values DW-1, DW-2, DW-3, . . . . For example, the sensor device 100*a* comprises a sensor device for a steering system of a vehicle 10 (FIG. 9).

A data transmission A1 from the sensor device 100*a* to the controller 100*b* can be performed, for example, via a SENT (Single Edge Nibble Transmission) interface or other data interface.

In further exemplary embodiments, for example, respectively successive data values DW-1, DW-2, . . . to be transmitted can be provided with a corresponding portion I-1_DW-1, I-1_DW-2, . . . of the first information I-1 or transmitted with this corresponding portion of the first information.

In further exemplary embodiments, for example, data values DW-1, DW-x, . . . that are not directly successive and are to be transmitted can be provided with a corresponding portion I-1_DW-1, I-1_DW-2, . . . of the first information or transmitted with this corresponding portion of the first information. In other words, for example, some of the data values to be transmitted can be transmitted together with corresponding portions of the first information, while some of the other data values to be transmitted, for example, can not be transmitted together with corresponding portions of the first information.

In further exemplary embodiments, FIG. 1, it is provided that determining 200 the first information I-1 forms 200*a* at least one message authentication code, for example a message authentication code—MAC—based at least on the at least one data value DW-1, wherein, for example, the message authentication code is of the CMAC type, e.g., according to Section 6.2; for example, having a length of 128 bits or more.

In further exemplary embodiments, FIG. 1, it is provided that the method comprises: forming 200*b* the first information I-1 based on the at least one data value DW-1 and on second information i-2, wherein, for example, the second information i-2 comprises at least one of the following elements: a) a random value (for example, provided by an optional random generator), b) a pseudo-random value, c) a counter value CV (FIG. 6) of an optional counter 102, wherein, for example, the counter 102 can be repeatedly initialized, e.g., based on a random value or pseudo-random value, e.g., upon activation of a method-executing apparatus 100*a*.

Figure 2:
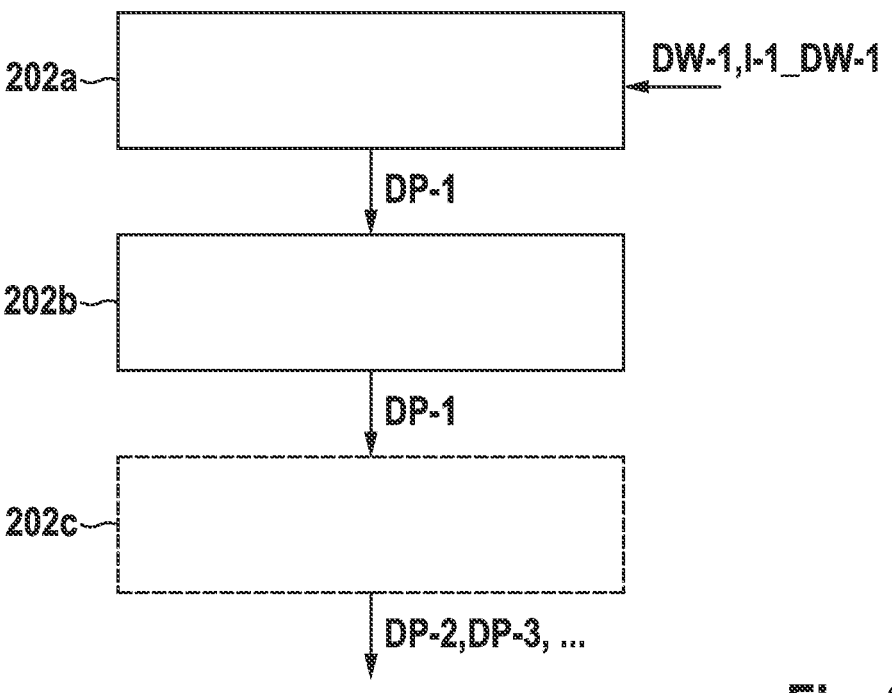

In further exemplary embodiments, FIG. 2, it is provided that transmitting 202 (FIG. 1) the plurality of data values DW-1, DW-2, . . . to the at least one further unit 100*b* comprises: combining 202*a* (FIG. 2), such as concatenating, a first data value DW-1 of the plurality of data values with a first portion I-1_DW-1 of the first information I-1 into a first data packet DP-1, transmitting 202*b* the first data packet DP-1 to the at least one further unit 100*b*, and optionally repeating 202*c* the process of combining 202*a* and transmitting 202*b* for at least one further data value DW-2, DW-3, . . . and, respectively, a corresponding portion I-1_DW-2, I-1_DW-3, . . . of the first information I-1, wherein further data packets DP-2, DP-3, . . . are optionally received and transmitted.

Figure 3:
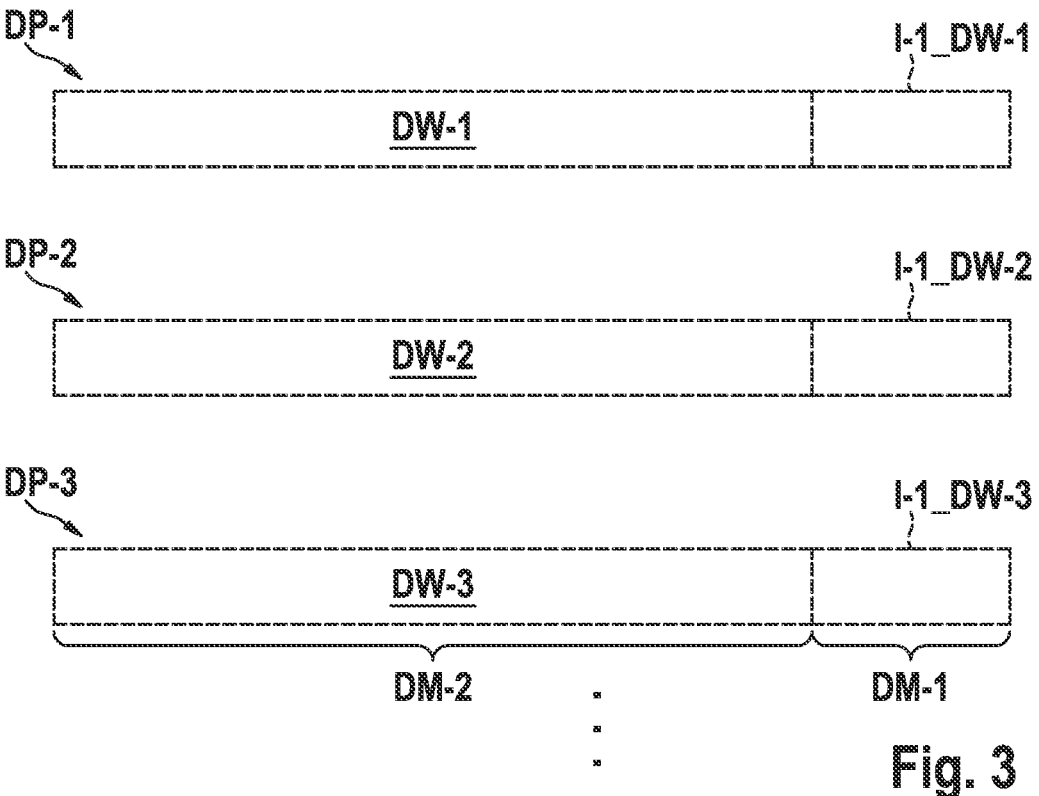

In further exemplary embodiments, FIG. 3, it is provided that an amount of data used to represent the portion of the first information I-1_DW-1, I-1_DW-2, I-1_DW-3, . . . is less than or equal to 20 percent of the data quantity DM-2 that is used to represent the at least one data value DW-1, DW-2, DW-3; e.g., less than or equal to 5 percent; e.g., less than or equal to 1 percent. The reference characters DP-1, DP-2, DP-3 according to FIG. 3 symbolize exemplary data packets for this purpose. Thus, the proportion of the respective portion of the first information I-1 in the entire data packet DP-1, DP-2, DP-3, . . . is comparatively low, so that, in further exemplary embodiments, the transmission of the data values DW-1, DW-2, DW-3, . . . itself is not affected.

Figure 4:
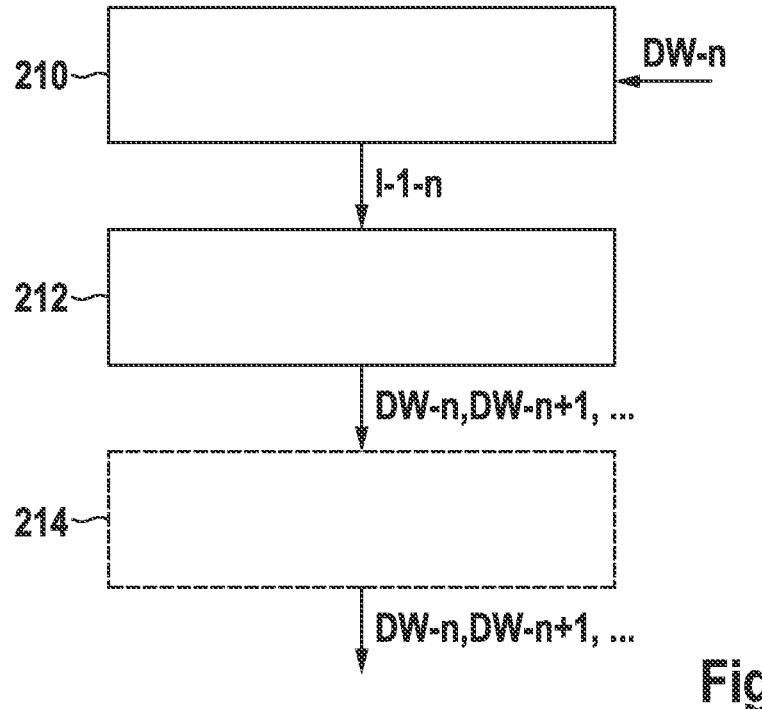

In further exemplary embodiments, FIG. 4, it is provided that the method comprises: determining 210 the first information I-1-*n* for each nth data value DW-n of the data source 100 (FIG. 6), with n>8, where n is a power of two, distributing 212 the first information I-1-*n* to *m* many data values DW-n, DW-n+1, . . . , with m>=2, wherein, for example, m=n; transmitting 214 the m many data values DW-n, DW-n+1, respectively, together with a respective, e.g., m-th, portion of the distributed first information I-1-*n*.

For example, in further exemplary embodiments, the data source 100 (FIG. 6) can repeatedly, e.g., periodically, provide data values; e.g., at a rate of 2 kHz, i.e., 2000 data values per second. For example, the first information I-1 can be formed for each 128th data value, e.g., in the form of a 128-bit CMAC. For example, the 128-bit CMAC can be divided into 128 portions, each consisting of 1 bit, each of which, for example, is transmitted together with a data value to the at least one further unit 100*b*. Thus, upon receipt of 128 data values with the respective portions of the first information I-1, the further unit 100*b* will have all 128 portions of the first information I-1, such that a local verification, for example, of the data value underlying the 128-bit CMAC can be performed by the further unit 100*b*.

In further exemplary embodiments, the portions of the first information I-1 can also have different sizes than the one bit set forth by way of example above; for example, two or more bits.

Figure 5:
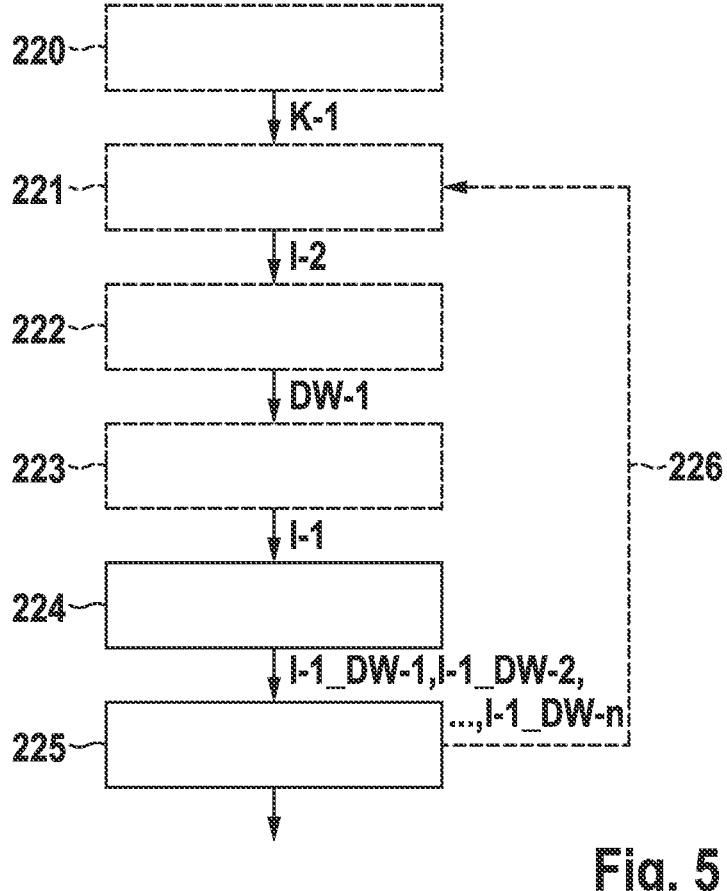

In further exemplary embodiments, FIG. 5, it is provided that the method comprises at least one of the following elements: providing 220 a first key K-1, for example for determining 200, 223 of the first information I-1, (e.g., a symmetric key for CMAC formation), providing 221 second information i-2 or, respectively, more than one item of second information; for example, for determining 200, 223 the first information I-1, determining 222 the first data value DW-1, determining 223 the first information I-1 based on the first key K-1, the second information i-2 and the first data value DW-1, partitioning 224 the first information I-1 into n many portions I-1_DW-1, I-1_DW-2, . . . , I-1_DW-n, transmitting 225 *n* many data values DW-1, DW-2, . . . each together with, for example, a respective portion I-1_DW-1, I-1_DW-2, . . . of the first information I-1 to the at least one further unit 100*b*, and optionally repeating 226 at least some aspects 221, 222, 223, 224, 225, for example, for at least one further data value and an associated portion of the first information.

FIG. 6 schematically illustrates a block diagram of a configuration 100*a*, 100*b* according to exemplary embodiments, the components of which have already been described by way of example above.

For example, the sensor device 100*a* can comprise an apparatus 300*a* for performing at least some aspects according to the embodiments; e.g., for performing aspects related to the transmission of data; e.g., according to at least one of FIGS. 1-5.

Figures 7, 8:
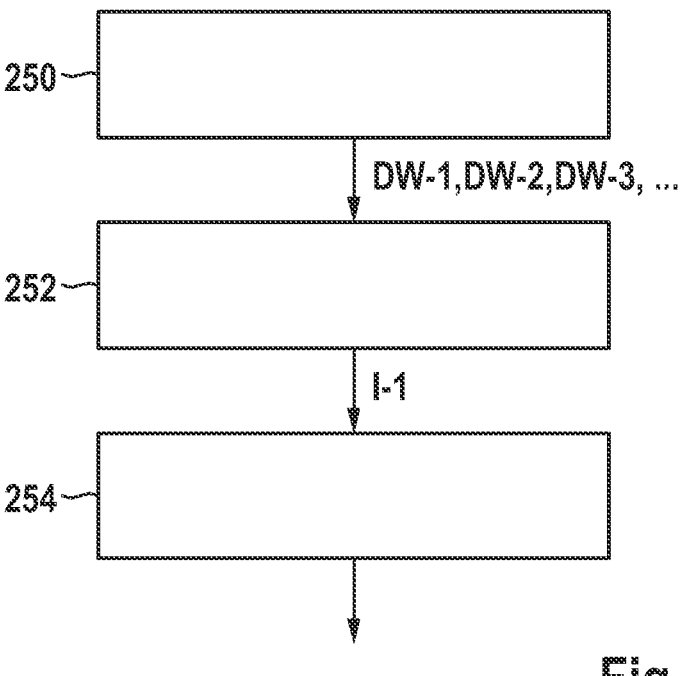

For example, controller 100b can comprise an apparatus 300b for performing at least some aspects according to the embodiments; e.g., for performing aspects related to receiving data; e.g., according to FIG. 7.

Other exemplary embodiments, FIG. 7, refer to a method—for example, a computer-implemented method—for receiving data associated with a data source 100 (FIG. 6); e.g., a sensor device 100a; e.g., for a motor vehicle 10, comprising: receiving 250 (FIG. 7) a plurality of data values DW-1, DW-2, DW-3, . . . , wherein at least some data values of the plurality of data values DW-1, DW-2, DW-3, . . . are each associated with a portion I-1_DW-1, I-1_DW-2, . . . (see, for example, FIGS. 1 and/or 5) of the first information or more than one item of first information I-1, wherein the first information I-1 is associated with a verification of an authenticity and/or integrity of at least a first data value DW-1 that can be provided and/or received using the data source 100, aggregating 252 (FIG. 7) portions I-1_DW-1, I-1_DW-2, . . . of the first information I-1 into the first information I-1, verification 254 of the authenticity and/or integrity of the at least one first data value DW-1 based on the first information I-1. For example, the method according to FIG. 7 can be carried out in the at least one further unit (e.g., a controller) 100b (FIG. 6); for example, to receive data values transmitted according to the principle according to the embodiments, see block arrow A1, with respectively associated portions of the first information I-1 from the sensor device 100a.

Further exemplary embodiments, FIG. 8, relate to an apparatus 300 for performing the method according to the embodiments.

In further exemplary embodiments, it is provided that the apparatus 300 comprises: a computing apparatus ("computer") 302, a memory device 304 associated with the computing apparatus 302 for at least temporarily storing at least one of the following elements: a) data DAT (for example, the data values DW-1, DW-2, . . . and/or data characterizing the first information I-1 and/or the second information i-2), b) computer program PRG; for example, for performing the method according to the embodiments.

In further exemplary embodiments, the memory device 304 comprises a volatile memory (e.g., random access memory (RAM)) 304a and/or a non-volatile (NVM) memory (for example, flash EEPROM) 304b, or a combination thereof, or other types of memory not explicitly mentioned.

Further exemplary embodiments relate to a computer-readable storage medium SM comprising instructions PRG that, when executed by a computer 302, cause the latter to perform the method according to the embodiments.

Further exemplary embodiments relate to a computer program PRG comprising instructions that, when the program PRG is executed by a computer 302, cause the latter to perform the method according to the embodiments.

Further exemplary embodiments relate to a data carrier signal DCS that characterizes and/or transmits the computer program PRG according to the embodiments. The data carrier signal DCS can be received, for example, by an optional data interface 306 of the apparatus 300.

By way of example, apparatus 300a and/or 300b according to FIG. 6 can comprise a configuration and/or functionality of apparatus 300 according to FIG. 8. Further exemplary embodiments, FIG. 9, refer to a sensor device 100a, for example for a motor vehicle 10, comprising at least one apparatus 300 (FIG. 8) (or 300a, FIG. 6), according to the embodiments.

Further exemplary embodiments, FIG. 9, refer to a controller 100b; for example, for a motor vehicle 10, comprising at least one apparatus 300 (FIG. 8) (or 300b, FIG. 6), according to the embodiments.

Further exemplary embodiments, FIG. 9, relate to a technical product; for example, a motor vehicle, 10 comprising at least one apparatus 300 (FIG. 8) according to the embodiments and/or at least one sensor device 100a according to the embodiments and/or at least one controller 100b according to the embodiments.

Figure 10:
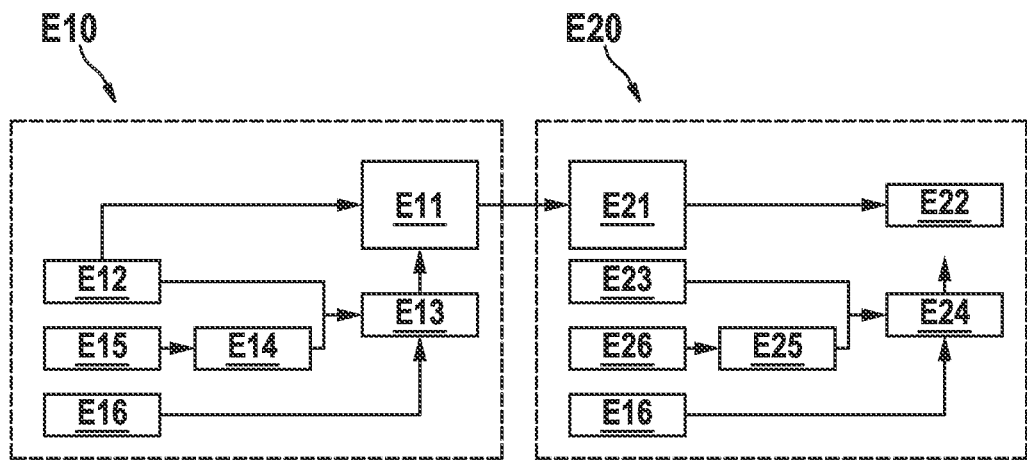

FIG. 10 schematically illustrates a simplified block diagram according to further exemplary embodiments. Element E10 symbolizes a sensor device; for example, at least similar to element 100a according to FIG. 6, and element E20 according to FIG. 10 symbolizes a controller; for example, at least similar to element 100b according to FIG. 6.

For example, element E10 symbolizes a sensor device for a steering system of a motor vehicle 10 (FIG. 9), and element E20 symbolizes a controller for processing data values DW-1, DW-2, DW-3, . . . of the sensor device E10.

Element E11 symbolizes an interface for transmitting data, e.g., data values, from sensor device E10 to controller E20, wherein, for example, the interface E11 is formed as a SENT interface.

Element E12 symbolizes measurement data, such as those obtained by the data source 100 (FIG. 6) in the form of a plurality of data values DW-1, DW-2, . . . , e.g., as data words each comprising 12 bits, which are determined at a rate of 2 kHz, for example.

Element E13 according to FIG. 10 symbolizes the formation of the first information I-1, for example in the form of a MAC, e.g., CMAC (cipher-based MAC), e.g., 128-bit CMAC; for example, based on at least one data value of block E12 and optional second items of information, such as those provided via block E14 (e.g., "freshness calculation" or providing a form of salt); for example, based on at least one pseudo-random value that is available from the optional pseudo-random generator E15.

Element E16 symbolizes a symmetric key for forming E13 of the CMAC. For the purpose of verifying the first information received or restored at controller E20, controller E20 also has the symmetric key E16 (for example, via configuration or parameterization; e.g., in the context of manufacturing the components E10, E20, and/or by a previous data transmission from the component E10 to the component E20).

In further exemplary embodiments, block E13 is configured, for example, to form a 128-bit CMAC for each 288-th data value of the measurement data E12 and to feed it to block E11 for portioning into, e.g., 128 different data values, which are, for example, transmitted to the controller E20 together with the respective 1-bit portion of the CMAC; e.g., in the form of 128 data packets.

The SENT interface E21 of the controller E20 receives the data packets, separates data values contained therein (for example, 12-bit data words) from the portions of the CMAC (each comprising 1 bit in the present case), provides the separated data values, see element E22, and aggregates the 128-bit CMAC, see element E23; for example, based on 128 received data packets.

Element E24 symbolizes a verification of the CMAC E23 based on the symmetric key E26 and the second information that can be formed by element E25 (for example, "freshness calculation" or determination of salt; for example, similar or identical to element E14). Element E26 symbolizes an initialization value (e.g., seed value) for element E25, which can, for example, be transmitted from element E10 to element E20; e.g., during activation of elements E10, E20. For example, the initialization value E26 is identical to the pseudo-random value that can be provided by the optional pseudo-random generator E15. The freshness calculation or salt E14 further increases safety, since the repetition of CMAC values that are based on identical measurement data or data values, for example, can thereby be prevented.

In further exemplary embodiments, the formation of the MAC, for example CMAC, is performed in a hardware-based manner. For this purpose, in further exemplary embodiments, a hardware accelerator for cryptographic primitives can be provided on the transmitter side (e.g., element 100a or E10) and/or on the receiver side (e.g., element 100b or E20); for example, in the form of a hardware security module HSM, see also FIG. 8. For example, the hardware accelerator for cryptographic primitives can also be implemented e.g., for example, in an application-specific circuit (ASIC).

The following describes an exemplary procedure or further exemplary aspects and embodiments as they can be combined according to further exemplary embodiments— for example, individually or in any combination with each other—with at least one of the aspects described above.

In further exemplary embodiments, the symmetric key E16 is saved both in the sensor device E10 and in the controller E20, for example as part of a production process.

After a start, e.g., start-up, of the controller E20, the controller E20 also starts the connected sensor device E10, for example. During an initialization of a sensor-controller communication process A1 (FIG. 6), the sensor device E10 generates a random value, for example by means of element E15, that can be used for initializing a freshness calculation or a salt value (e.g., in the sense of the second items of information i-2). This random value is transmitted from the sensor device E10 to the controller E20, for example in an initialization phase.

In further exemplary embodiments, the freshness calculation according to element E14 can be realized, for example, as incrementing of an e.g., initial random value.

In further exemplary embodiments, the sensor device E10 begins to collect measurement data; for example following an initialization phase. For example, an nth measurement value, such as each nth measurement value, is chained with a current value from the freshness calculation E14; e.g., concatenated. The value thus generated is hereinafter referred to as the MAC input.

In further exemplary embodiments, a MAC, e.g., CMAC, is calculated from the MAC input using the introduced symmetric key E16; for example, based on or according to AES CMAC; for example, according to NIST Special Publication 800-38B.

In further exemplary embodiments, the MAC is preferably realized using hardware; for example, a hardware accelerator for cryptographic primitives.

In further exemplary embodiments, the MAC is divided, for example, into 128 fragments, e.g., each with a length of 1 bit, for example, and portioned into 128 messages, such as data packets DP-1, DP-2, . . . (e.g., together with corresponding data values DW-1, DW-2, . . . ) and transmitted to controller E20.

In further exemplary embodiments, the controller E20 at least temporarily saves a received measurement value to be verified, or data value DW-1, and calculates a comparison MAC based on the received data value DW-1, the introduced key E16 and the current freshness value E25, if applicable.

In further exemplary embodiments, the controller E20 compiles the 128 received fragments (portions of the first information I-1), each with a length of 1 bit, into a reconstructed MAC.

In further exemplary embodiments, the controller E20 compares the comparison MAC to the reconstructed MAC. If the two MAC values match, it can be assumed in further exemplary embodiments, for example, that the obtained measurement value or data value DW-1 was safely transmitted in terms of integrity, authenticity (and optionally freshness).

Figure 11:
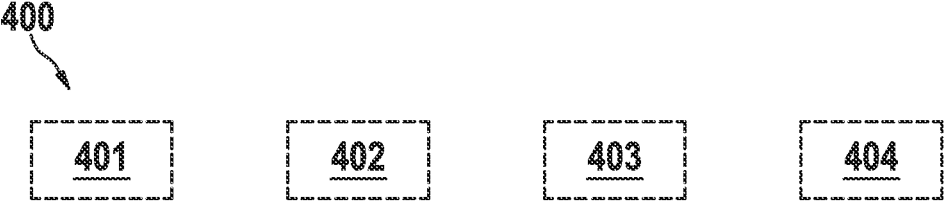

Other exemplary embodiments, FIG. 11, relate to a use 400 of the method according to embodiments and/or apparatus 300, 300a, 300b according to the embodiments and/or the sensor device 100a, E10 according to the embodiments and/or the controller 100b, E20 according to the embodiments and/or the technical product 10 according to the embodiments and/or the computer-readable storage medium SM according to the embodiments and/or the computer program PRG according to the embodiments and/or the data carrier signal DCS according to the embodiments for at least one of the following elements: a) securing 401, such as securing by cryptographic means, an integrity and/or authenticity of data associated with the data source 100, b) detecting 402 attacks on a data link A1 between the data source 100 and the at least one further unit 100b, c) distributing 403 the first information I-1 into a plurality of data packets DP-1, DP-2, DP-3, . . . , d) preventing 404 the unauthorized introduction of data into a data link A1 between the data source 100 and the at least one further unit 100b.

What is claimed is:

1. A computer-implemented method for transmitting data associated with a data source comprising:

determining first information based on (i) at least one data value of a plurality of data values available via the data source and (ii) second items of information, the first information configured to enable a verification of authenticity and/or integrity of the at least one data value of the plurality of data values; and transmitting the plurality of data values to at least one further unit, wherein at least some data values of the plurality of data values are transmitted together with a respective portion of the first information, wherein the second items of information comprise (i) a random value or a pseudo-random value, and (ii) a counter value of a counter, and wherein the counter is repeatedly initialized based on the random value or the pseudo-random value upon activation of an apparatus performing the method.

2. The method according to claim 1, wherein the determining the first information comprises:

forming at least one message authentication code based on the at least one data value, wherein the at least one message authentication code is a cipher-based message authentication code ("CMAC") type having a length of at least 128 bits.

3. The method according to claim 1, wherein the transmitting the plurality of data values to the at least one further unit comprises:

concatenating a first data value of the plurality of data values with a first portion of the first information into a first data packet;

transmitting the first data packet to the at least one further unit; and repeating the concatenating and transmitting for at least one further data value of the plurality of data values.

4. The method according to claim 1, wherein an amount of data used to represent the respective portion of the first information is less than or equal to twenty percent of an amount of data used to represent the at least one data value.

5. The method according to claim 1, further comprising:

determining the first information for each $n$th data value of the data source, wherein $n > 8$, and wherein $n$ is a power of two;

distributing the first information to $m$ data values, wherein $m > 2$, and wherein $m = n$; and transmitting the $m$ data values, respectively, together with a corresponding portion of the distributed first information.

6. The method according to claim 1, comprising:

providing (i) a first key for determining the first information, and (ii) at least one second information for determining the first information;

determining a first data value of the plurality of data values;

determining the first information based on the first key, the second information, and the first data value;

portioning the first information into $n$ portions; and transmitting $n$ data values, respectively together with a respective portion of the first information to the at least one further unit.

7. The method according to claim 1, further comprising:

securing cryptographically an integrity and/or authenticity of the data associated with the data source based on the determined first information.

8. The method according to claim 1, further comprising:

detecting attacks on a data link between the data source and the at least one further unit based on the determined first information.

9. The method according to claim 1, further comprising:

distributing the first information among a plurality of data packets.

10. The method according to claim 1, further comprising:

preventing an unauthorized introduction of data into a data link between the data source and the at least one further unit based on the determined first information.

11. A non-transitory computer-readable storage medium comprising instructions that, when executed by a computer, cause the computer to perform the method according to claim 1.

12. A computer-implemented method for receiving data associated with a data source comprising:

receiving a plurality of data values, at least some data values of the plurality of data values are each associated with a portion of first information, the first information allows a verification of authenticity and/or integrity of at least a first data value of the plurality of data values; and aggregating the portions of the first information into the first information, wherein verification of the authenticity and/or integrity of the at least one first data value is based on the first information, wherein the first information is determined based on (i) the first data value, and (ii) second items of information; and wherein the first data value is transmitted from the data source together with a respective portion of the first information, wherein the second items of information comprise (i) a random value or a pseudo-random value, and (ii) a counter value of a counter, and wherein the counter is repeatedly initialized based on the random value or the pseudo-random value upon activation of an apparatus performing the method.

* * * * *